SYSTEM FOR TRANSFERRING DATA TO A NUMBER OF TERMINALS

Filed Aug. 23, 1963 5 Sheets-Sheet 1

INVENTORS
JOHN A. McLAUGHLIN
HENRY G. HOEHMANN
LAVERNE E. RICKARD
BY
Fraser and Bogucki
ATTORNEYS INVENTORS
JOHN A. McLAUGHLIN
HENRY G. HOEHMANN
LAVERNE E. RICKARD
BY
Fraser and Bogucki
ATTORNEYS INVENTORS
JOHN A. McLAUGHLIN
HENRY G. HOEHMANN
LAVERNE E. RICKARD
BY
Fraser and Bogucki
ATTORNEYS INVENTORS
JOHN A. McLAUGHLIN
HENRY G. HOEHMANN
LAVERNE E. RICKARD
BY
Fraser and Bogucki
ATTORNEYS INVENTORS
JOHN A. McLAUGHLIN
HENRY G. HOEHMANN
LAVERNE E. RICKARD
BY
Fraser and Bogucki
ATTORNEYS United States Patent Office 3,332,068
Patented July 18, 1967

3,332,068
SYSTEM FOR TRANSFERRING DATA TO A NUMBER OF TERMINALS

John A. McLaughlin and Henry G. Hoehmann, Los Gatos, and La Verne E. Rickard, San Jose, Calif., assignors to International Business Machines Corporation, New York, N.Y., a corporation of New York Filed Aug. 23, 1963, Ser. No. 304,044
14 Claims. (Cl. 340—172.5)

This invention relates to systems which transmit digital data between different points, and particularly to systems for transmitting data from a central source to a number of output terminals for recordation by separate output devices.

Modern digital data processing techniques provide capabilities for performing, in some manner, virtually every function needed by complex digital data processing systems. If one part of an overall system operates at a different speed than another, or operates on a different time base, intermediate storage or buffer equipment is available which permits the orderly transfer of data between the separate instrumentalities. Similarly, if data from a central source is to be distributed to a number of separate output terminals, sequentially operated or selectively controlled means are available to distribute each message to its desired terminal. The systems which are currently employed, however, are often wholly uneconomical for many applications.

If, for example, data supplied at a high rate from a source is to be used to control a relatively slow output device, a magnetic drum system may be employed as an intermediate buffer to receive an entire message from the high speed system, and to transfer the message, one character at a time, to the output device. Extensive timing, addressing and control circuitry are usually used to effect the transfer. Another form of system is known in which the individual characters of the message are entered in sequence into different positions of a random access memory which is then scanned in sequential fashion in synchronism with the position of a cyclic output device. The random access memory is itself more expensive, on a price per bit basis, than is a magnetic drum or disc system, the major costs involved being in the addressing, driving and reading circuits which must be used. Both of the aforementioned prior art systems require separate buffers for each output terminal, and thereby increase system costs in accordance with the number of associated output terminals.

A specific example of the type of problem which is here considered is found in modern communication systems which use digital techniques to process, transmit, and record data. There often arises a need for controlling many different output devices from a single common data processor, with messages being recorded by different output devices located at separate terminals. These terminal locations may use printer devices distributed throughout a single commercial establishment, or printer devices separated by much greater distances. In accordance with a given program, or on request from individual output terminal units by means which are not here considered, a central data processing system may prepare messages for each of the terminals. The data processing sytem will typically operate at rates of the order of hundreds of kilocycles to megacycles per second, whereas the many individual printers will preferably be as simple and inexpensive as possible, and therefore operate at rates of the order of five to fifty characters per second.

A particularly simple, reliable, and effective form of data recording output device is a rotating print wheel having different output characters disposed about its periphery. A print hammer disposed adjacent the print wheel is actuated at a proper time during each rotation to print a selected character, following which the paper is advanced and another character is printed during the following rotation.

It is clear from the outset that for minimization of costs the system should avoid the need for separate buffer and control circuitry at each output device. It will also be appreciated that the use of a computer program to control the separate output devices directly from the central source would be both time consuming and wasteful of computer time in operation. Furthermore, the high speed central system cannot be locked to the slow rate of the individual output devices without great loss of efficiency. Therefore, some means must be provided for distributing the data properly to the separate output terminals, so as to maintain both the output devices and the central data system in substantially continuous operation, at full data transfer rates. It is highly desirable to be able to use cyclical storage devices such as magnetic drums for the transfer of data, and to dispose these elements as part of the central data processing system. Those skilled in the art will recognize that the problems of selective data distribution at low cost typified by the example heretofore given have not been satisfactorily resolved by the systems of the prior art.

A further problem involved in such systems is the minimization of the costs of each individual output terminal. With cyclic recording devices, signals must be provided to indicate, to the central data processor, both the start of each cycle and each successive character position during a cycle.

It is therefore an object of the present invention to provide an improved system for the distribution of data from a high speed central data processing system to a number of output terminals.

Another object of the present invention is to provide an improved system, employing central logic, for distributing data to a number of continuously operating output devices.

Another object of the present invention is to provide improved systems for actuating each of a number of cyclically operating output devices with low cost means from a high speed central source.

Another object of the present invention is to provide improved forms of cyclic output devices for operating as buffer mechanisms in cooperation with a source of data.

Another object of the present invention is to provide improved means for transferring the separate characters of messages provided at high speed to synchronously operating output devices having a much slower rate of speed.

Another object of this invention is to provide an improved cyclical output device for cooperation with a central data processor.

Systems in accordance with the present invention effect selective data distribution at low cost by the successive transfer of data through a series of cyclic storage devices having different rates of operation. Each storage device, together with its associated control circuits, is hereafter termed a "revolver" for convenience. Multi-character messages recorded at an incoming data rate on one of the revolvers are transferred, one character at a time, to a second of the revolvers which operates at a higher cycling rate but the same data rate. At the second, or synchronizing, revolver, the character next to be printed at a given output terminal is initially stored as a binary number representing successive character positions from an index position on the print wheel. As each print wheel rotates, it generates a pulse at each character position, the pulse being returned through a high speed scanning system and a high speed revolver, called a terminal revolver, to the synchronizing revolver. At the synchronizing revolver, the count for a given output device is successively re duced to zero at the printing position. A printing instruction signal is then generated, transferred through the terminal revolver, and then distributed to the proper output terminal. The terminal revolver is synchronized with the scanner and distributor system, and provides a number of connections to each output terminal for each character position of the various continuously rotating print wheels.

A particular example of a system in accordance with the invention is provided by a communications system utilizing a central data source having a high data rate and a number of output terminals, each of which uses a rotating print wheel. A feature of the system is the use of only three cyclic storage devices and a minimum of control circuits for operating many print wheels from a single data source. No address registers or counters are required, and no intermediate buffers are used, even for single characters. The printing control pulses are generated at the proper points in time relative to the cycling of each of the output print wheels.

Another feature of the invention is the arrangement of recirculating data loops with bypass and control paths such that data in the revolvers may be selectively modified. Thus data characters may be shifted in position or changed in nature by operation in the time domain instead of by the use of static register or arithmetic techniques.

In accordance with another aspect there may be provided a low cost terminal set which cooperates with a data distribution system. Each terminal set includes a common shaft on which are mounted a clock wheel with a pulse generating mechanism, a cam mechanism and a print wheel. Pulses indicating the passage of successive characters on the print wheel are generated by the clock wheel and pulse mechanism and returned to the central source on the same line on which are provided the actuating print pulses for that data set. The cam mechanism resets the printing mechanism and advances the paper and ribbon when the print wheel is at its "home" position.

The foregoing and other objects, features and advantages of the invention will be apparent from the following more particular description of preferred embodiments of the invention, as illustrated in the accompanying drawings, in which.

Figure 1:
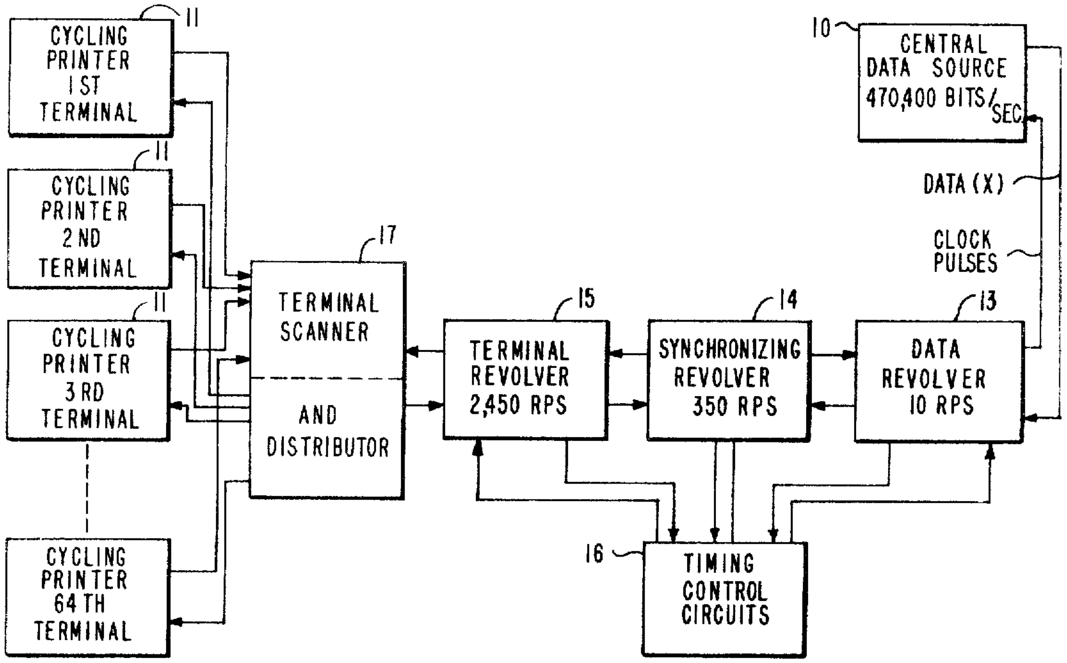
FIG. 1 is a block diagram representation of the general arrangement of a system in accordance with the invention and including a scanner and distributor, a terminal revolver, a synchronizing revolver and a data revolver.
Figure 3:
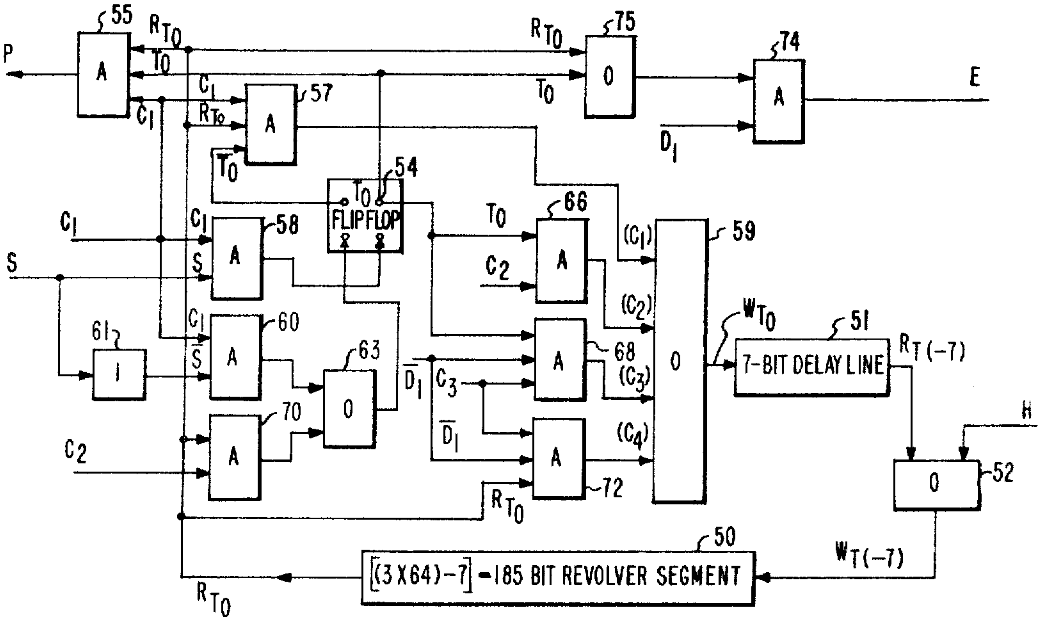
FIG. 3 is a block diagram of a terminal revolver which may be used in the system of FIG. 1.

The general organization of a system in accordance with the invention is shown in FIG. 1, in which a central data source 10 is coupled to control each of sixty-four cycling printers 11. The cycling printers 11 may each include a continuously rotating print wheel and a controllably triggered hammer mechanism, by which successively advanced printing paper is urged forcefully but momentarily against a desired character on the periphery of the print wheel. The cycling printers 11 typically operate at speeds of five characters per second, whereas the central data source 10 may have a speed of 470,400 bits per second (67,200 characters per second). Therefore, proper coaction of these units requires some adjustment of data in the time domain in order to separate the messages and actuate the print wheels at proper times. The printers include means (described below) for returning control pulses to designate the successive character positions.

In accordance with the present invention, the needed time domain buffer action, the selective distribution of data and the time domain control of the printers are all provided by means located at the central common terminal. For economy and simplicity, data is transferred and stored in serial form. The individual data messages from the central data source 10 are first entered in a data revolver 13, the term "revolver" designating a recirculating storage device having a selected cycling time and total capacity, together with associated transducers and control logic. Each message is serially entered at a message segment in the storage device of the data revolver 13 in the form of a succession of characters. The characters are provided and stored in the form of binary counts representing character positions away from the index or "home" position of the print wheel. The successive messages are made available at a relatively low cycling rate, such as 10 revolutions per second in this example. For synchronization of the data revolver 13 with the central data source 10 a clock pulse generator operated from the revolver may be employed.

The data is transferred from the data revolver 13 to a synchronizing revolver 14, one character at a time, with individual characters (or small character groups) being stored from each message. The synchronizing revolver 14 operates at a considerably higher cycling rate (e.g. 350 revolutions per second) to make the characters for each output device available within shorter access times. The synchronizing revolver 14, however, provides additional functions. It modifies the binary count in accordance with changes in the character position of the printer for which the character is destined. Control pulses returned from each cycling printer are used to successively reduce the stored counts, and an actuating pulse is provided whenever the count reaches zero.

Actuating pulses must be distributed to the various output terminals, and control pulses must be received from those terminals at proper operating times. These final space distribution and timing control functions are effected by a terminal revolver 15 having a high cyclic rate (e.g. 2450 revolutions per second) and a terminal scanner and distributor 17. The printing positions of the cycling printers 11 are continuously scanned during rotation by the scanner and distributor 17 at a rate sufficiently high for each change of position to be denoted by a control pulse entered at the appropriate segment of the terminal revolver 15. The distributing rate is also sufficiently high for each cycling printer 11 to be actuated to print the proper character. The data rates and operations of the various revolvers may be kept constant and in synchronism by timing control circuits 16 which may take any of a number of forms.

Reliable, low cost components located entirely at a central terminal therefore are used in the concurrent performance of the multiple functions required to be performed by this system. Actuating pulses for the output devices are generated in a manner which permits instantaneous recording at any selected output device, although no further buffers or controls are needed.

Figure 2:
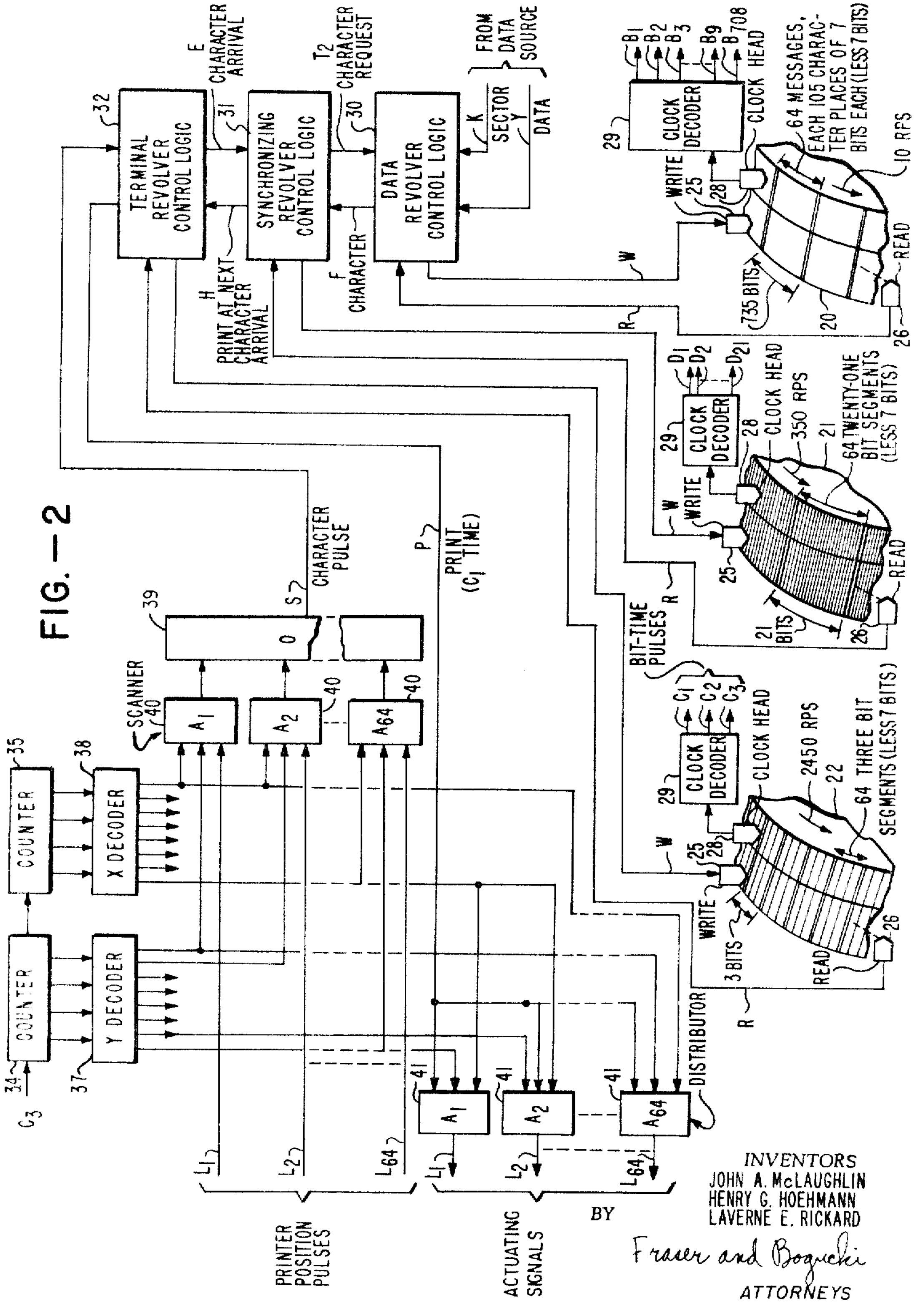
FIG. 2 is a combined idealized and simplified perspective and block diagram representation of the system of FIG. 1, showing certain of the elements and relationships in greater detail.

Inasmuch as individual sub-systems are shown and described separately below, it is convenient here to set forth the interconnections between these sub-systems and the organization of data in somewhat greater detail, as shown in FIG. 2. Note, however, that the clock signal generators which are shown are illustrated merely for convenience, and constitute a satisfactory way to achieve synchronization of data flow with separate but coupled drums. It is preferred, however, to use a different timing signal generator system operated from sector pulses on a drum in the central data source, as is described in detail below in conjunction with FIG. 6.

In this system, referring now to FIG. 2, the recirculating storage portions of the revolvers principally consist of rotating drum systems 20, 21 and 22 respectively, only parts of which are shown for simplicity. The data drum 20 has a storage capacity, between its write and read heads 25 and 26 respectively, for approximately sixty-four messages, each 105 characters long, with each character consisting of seven bits. Seven less bits than this total are actually used, these being supplied elsewhere. The five extra characters (35 extra bits) above normal message lengths of 100 characters are provided in the format used in the data source and are not employed herein except for message spacing. The synchronizing drum 21 has seven bits less than sixty-four character segments, each consisting of twenty-one bits, while the terminal drum 22 has a capacity for seven bits less than sixty-four segments, each consisting of three bits. With the given character rate (470,400 bits per second) each of these drums is rotated at a speed which provides a compatible data transfer capability. Separate clock tracks, clock reproducer heads 28 and clock decorder circuits 29 may be used, in this example only, to provide bit-time pulses used in the synchronized transfer and conversion of data.

The write and read heads 25, 26 respectively of each of the drums 20, 21, 22 are coupled within the individual revolver systems with associated control logic circuits 30, 31, 32 respectively to provide recirculating data loops. Data (Y) and "computer ready" pulses (K) from the data source are applied to the data revolver control logic 30, and individual characters (F) are applied to the synchronizing revolver upon the generation of $T_2$ (character request) signals. The terminal revolver control logic 32 receives "print at next character" (H) signals from the synchronizing revolver control logic 31 and provides "character arrival" signals (E). Character pulses (S) are applied from the scanner and print pulses (P) are delivered to the distributor by the terminal revolver control logic 32. All of these designations are employed with like meanings below in the detailed descriptions of the arrangement and functioning of the various revolvers.

The scanner and distributor system functions to couple appropriate outputs of the terminal revolver control logic 32 to the sixty-four incoming and sixty-four outgoing lines which are connected to the output terminals. These connections are made under the common control of a pair of serially coupled counters 34, 35. X and Y decoder circuits 37, 38 responsive to the counters 34, 35 select individual ones of the input lines from the output terminals. Pairs of signals from the decoder circuits 37, 38 actuate AND gates 40 designated $A_1$, $A_2$ . . . $A_{64}$, to provide a series of signals, designated S pulses from an OR circuit 39 to the terminal revolver control logic 32. The same decoders 37, 38 but in different output combinations actuate other AND gates 41, designated $A_1$, $A_2$ . . . $A_{64}$ for return of actuating signals on return lines to the individual printers. As shown below in conjunction with FIG. 7, the same lines may be used for both the S and the P pulses for each output terminal. The scanner and distributor can operate in different sequences, with the pulse transfers being effected at slightly different times.

The detailed system may best be understood by separate consideration of each of the functional units, including the revolvers 13–15 and timing control circuits 16. Because the data flow is kept in synchronism with a basic timing cycle related to the synchronizing revolver segments, some appreciation of the relationships of the various timing pulses should be had at the outset. The twenty-one bits of each segment of the synchronizing revolver are defined by successive pulses $D_1$, $D_2$ . . . $D_{21}$ respectively. A sector pulse, which may be provided by a separate clock track within the central data source, is provided to initiate this cycle. The three bits of each segment of the terminal revolver are defined by successive pulses $C_1$, $C_2$, $C_3$, occurring at the same repetition rate as the $D_1$ . . . $D_{21}$ pulses. An eight pulse series, designated $B_1$ to $B_8$, is used at the data revolver, but defines only the first part of each message segment. An additional $B_{708}$ pulse is generated near the end of each message segment.

These various pulse series are slightly shifted in time relation, so that $C_3$ occurs at $D_1$ time and $B_1$ occurs at $D_2$ time. Accordingly, the principal sequences occur in the following relation, starting with a sector pulse at the synchronizing revolver;

TABLE A

| D pulses | C pulses | B pulses |
|---|---|---|
| $D_{20}$ | $C_1$ | |
| $D_{21}$ | $C_2$ | |
| $D_1$ | $C_3$ | |
| $D_2$ | $C_1$ | $B_1$ |
| $D_3$ | $C_2$ | $B_2$ |
| $D_4$ | $C_3$ | $B_3$ |
| $D_5$ | $C_1$ | $B_4$ |
| $D_6$ | $C_2$ | $B_5$ |
| $D_7$ | $C_3$ | $B_6$ |
| $D_8$ | $C_1$ | $B_7$ |
| $D_9$ | $C_2$ | $B_8$ |
| $D_{10}$ | $C_3$ | |
| $D_{11}$ | $C_1$ | |
| $D_{12}$ | $C_2$ | |
| $D_{13}$ | $C_3$ | |
| $D_{14}$ | $C_1$ | |
| $D_{15}$ | $C_2$ | |
| $D_{16}$ | $C_3$ | |
| $D_{17}$ | $C_1$ | |
| $D_{18}$ | $C_2$ | |
| $D_{19}$ | $C_3$ | |

Significant use is made of these relationships in the various parts of the system described below.

*Terminal revolver*

Each $C_3$ time of the terminal revolver cycle is used to shift the scanner and distributor to new output positions. Thus the terminal revolver is locked in time or synchronized directly with the scanner and distributor system, to permit the transfer of serially disposed data to proper output terminals. The 2450 r.p.s. rate of the terminal revolver provides the basic data transfer rate of 470,400 bits per second, although the scanner and distributor both shift at a rate of 156,800 times per second. With each of the sixty-four output devices having sixt-four character spaces and operating at five cycles per second, there are 20,480 total changes of printing position per second and 320 total characters printed per second at full capacity rate. These relative change rates (156,800 and 20,480) signify that each printing position on each output device is coupled through the scanner and distributor for data transfer at least seven times during the interval the associated character can be printed. The terminal revolver effects data transfer in both directions between the synchronizing revolver, on which successive characters are serially disposed, and the space distributed output terminals.

Note that by use of the $C_3$ bit time as the start of a bit segment, the scanner and distributor positions are set during $C_3$, $C_1$, and $C_2$ times before being shifted again. This fact and other relationships permit a given output terminal to be scanned one position ahead of the distribution of control pulses.

*Data readout and recirculation.*—In the terminal revolver the basic storage element is a cyclic storage or revolver segment 50 having seven less bits than 64 bit segments of three bits each, or a total of 185 bits. The full 192 bit recirculating loop is completed by a series-connected 7-bit delay line 51. The entry and readout devices for the revolver may be conventional and accordingly have not been shown in detail. For reference, the input points are designated W (write) and the output points are designated R (read). With cycle times from $T_0$ to $T_{192}$ within a full cycle, H pulses entered through an OR circuit 52 into the revolver segment are provided at $W_{T(-7)}$ time if the normal write position is called $W_{T0}$ and the normal read position is called $R_{T0}$.

Basic control and gating functions for the switching and recirculation of control pulses are provided by a $T_0$ flip-flop 54 and conventionally designated AND, OR and Inverter (I) circuits. The H input signals occur at $D_9$ ($C_2$) bit times, but because they are not entered at the normal write position but $W_{T(-7)}$ they are actually shifted to $C_1$ bit time. This printing control signal is read out at the normal read time $R_{T0}$ from the revolver segment 50 to an AND gate 55 which is controlled by the "set" output signal ($T_0$) from the $T_0$ flip-flop 54 and by concurrent application of a $C_1$ pulse to the AND gate 55. If the proper conditions are met, the P pulse is generated during an interval in which the distributor couples the terminal revolver to the appropriate output terminal. If the $T_0$ signal is not then available because of the conditions stated below, the recirculation loop is employed.

In the recirculation loop, the reproduced print control pulse together with the timing pulse $C_1$ and the reset signal ($\overline{T}_0$) from the $T_0$ flip-flop 54 fully actuate a recirculation AND gate 57, the output signal from which passes an OR circuit 59 to be applied as an input signal to the delay line 51. Thus, to repeat, if a control pulse H for operating an output printer is present, it occurs at $C_1$ time. It is either used as a print signal (P) when read out of the revolver segment 50, or recirculated depending upon the state of the $T_0$ flip-flop 54.

The $C_1$ time of each 3-bit segment is thus reserved for print control signals. Actuation of a given printer requires that the S signal first be provided to indicate that the character position of the output device has arrived in printing positon. As is described in detail below, the distributor connection to the terminals lags the scanner by one line. The S signal for a given position will be recorded at $C_1$ time and will set the $T_0$ flip-flop 54 by $C_2$ time. The $T_0$ flip-flop 54 will stay on during $C_3$ time and $C_1$ time of the next segment before conditions on the next line can change $T_0$. Therefore, if the H signal appears at the output $R_{T0}$ of revolver 50 at this same $C_1$ time and $T_0$ is still on, the print signal P is generated at AND gate 55.

The high speed of the terminal revolver insures at least seven scans of each printing position at a given output terminal, during at least one of which scans the S signal will be present. The seven scans also insure coincidence of the $C_2$ and $D_9$ bit times, for proper entry of the data. Accordingly, if a printing action is to take place the proper timing relationship is assured at some time while the character is still under the print hammer. When the S signal terminates for a given bit segment, or if it is not provided, the $T_0$ flip-flop 54 is reset at $C_1$ time, because an AND gate 60 is conditioned by an $\overline{S}$ signal from an inverter 61, to provide a reset signal through an OR circuit 63.

Basically, the "print at next character" signal (H) need only be delayed enough cycles until the character is in printing position. Once this printing control signal is entered from the synchronizing revolver at its specific time in the D cycle, it is effectively locked in proper relation in the scanner and distributor sequence to the output terminal for which it is desired. In contrast, the S ("character pulse") signals are received during the majority of scans of the printing positions but must be retained by the terminal revolver until the proper character segment and the proper D bit time within the character segment are both available.

Proper transfer of data and proper shifting in the time domain result from the use of the 21 bit D-cycle in conjunction with the C cycle of three bits, and the use of a similar proportionality in cycling rates. Under these circumstances the $D_1$ bit time occurs only once each seven C bit segments, but all C segments which are scanned are presented at least once during a single synchronizing revolver cycle because there are seven terminal revolver cycles during the same time.

*Generation of the character arrival (E) signal.*—Once the S signal is returned to the terminal revolver and the $T_0$ flip-flop 54 is set at $C_1$ bit time for a given bit segment the generation of a controlled sequence of pulse shifts and recirculations is begun, terminating in proper timed return of the E signal to the synchronizing revolver. On the next $C_2$ pulse, with $T_0$ present, an AND gate 66 is fully activated, and a pulse is written into the recirculating loop through the OR circuit 59 to reappear at $C_2$ time one fullcycle later. During this interval a control pulse ($R_{T0}$) is also entered within the recirculation loop at $C_3$ time because the $T_0$ flip-flop 54 remains set. The $T_0$ signal conditions an AND gate 68 which receives $C_3$ and a $\overline{D}_1$ signal (provided 6 out of 7 $C_3$ bit times in accordance with the timing signal schedule), and writes an input pulse in the cyclic storage at $C_3$ time. Both the $C_2$ and $C_3$ pulses reappear as control pulses $R_{T0}$ from the loop one full cycle later. At this later time, the concurrent $C_2$ and $R_{T0}$ pulses reset the $T_0$ flip-flop 54 by passing a pulse through an AND gate 70 and the OR circuit 63 to the input terminal of the $T_0$ flip-flop 54. The $C_3$ pulse alone thereafter recirculates for as many cycles as needed to coincide with the $D_1$ pulse, so that it may be entered in the proper position on the synchronizing revolver. This recirculation is effected by an AND gate 72 which is fully activated when $C_3$, $\overline{D}_1$, and $R_{T0}$ are concurrently present. As soon as the $D_1$ signal appears the control pulse is blocked from re-entry into the loop.

The E signal is finally generated, therefore, at an AND gate 74 to which $D_1$ is applied along with either $R_{T0}$ from the recirculating loop or $T_0$ from the flip-flop 54, through an OR circuit 75. In the majority of instances the $T_0$ flip-flop 75 will be reset prior to application of the appropriate $D_1$ pulse, which occurs only every seven $C_3$ bit times. Therefore, the recirculated $C_3$ pulse is held in the loop until it coincides with $D_1$ and the E signal is returned.

This system completely avoids the use of counters, registers and address control equipment such as employed in prior art systems. The complex functions which are to be met are fulfilled by using a selected speed relationship between the terminal revolver and the synchronizing revolver and a selected timing signal relationship, such that a full character interval is established for each character position on the cyclic output devices. During this full character interval, the output devices shift one character position, the terminal revolver cycles slightly more than seven times, and the synchronizing revolver cycles slightly more than once.

The interleaved relationship of the data on the synchronizing revolver and the timing relationships provide the transfer of print (P) signals to the distributor in synchronism with the distributor operation. A control pulse is transferred into the terminal revolver at a proper bit segment and with bit segments in proper order, simply by choosing the synchronizing revolver readout time ($D_9$ for H) and its read in time ($D_1$ for E), as well as the successive bit segment placements. Thus much data passes through the terminal revolver between the time successive H pulses from the synchronizing revolver are received. The H to P pulse sequence is separate from the S to E pulse sequence, but both must be accomplished in one pass of the synchronizing revolver. Seven passes of the terminal revolver are however available, and thus it forms the buffer between the rapid scanning and distribution and to the terminals and the single pass readout of the synchronizing revolver.

*Synchronizing revolver*

Figure 4:
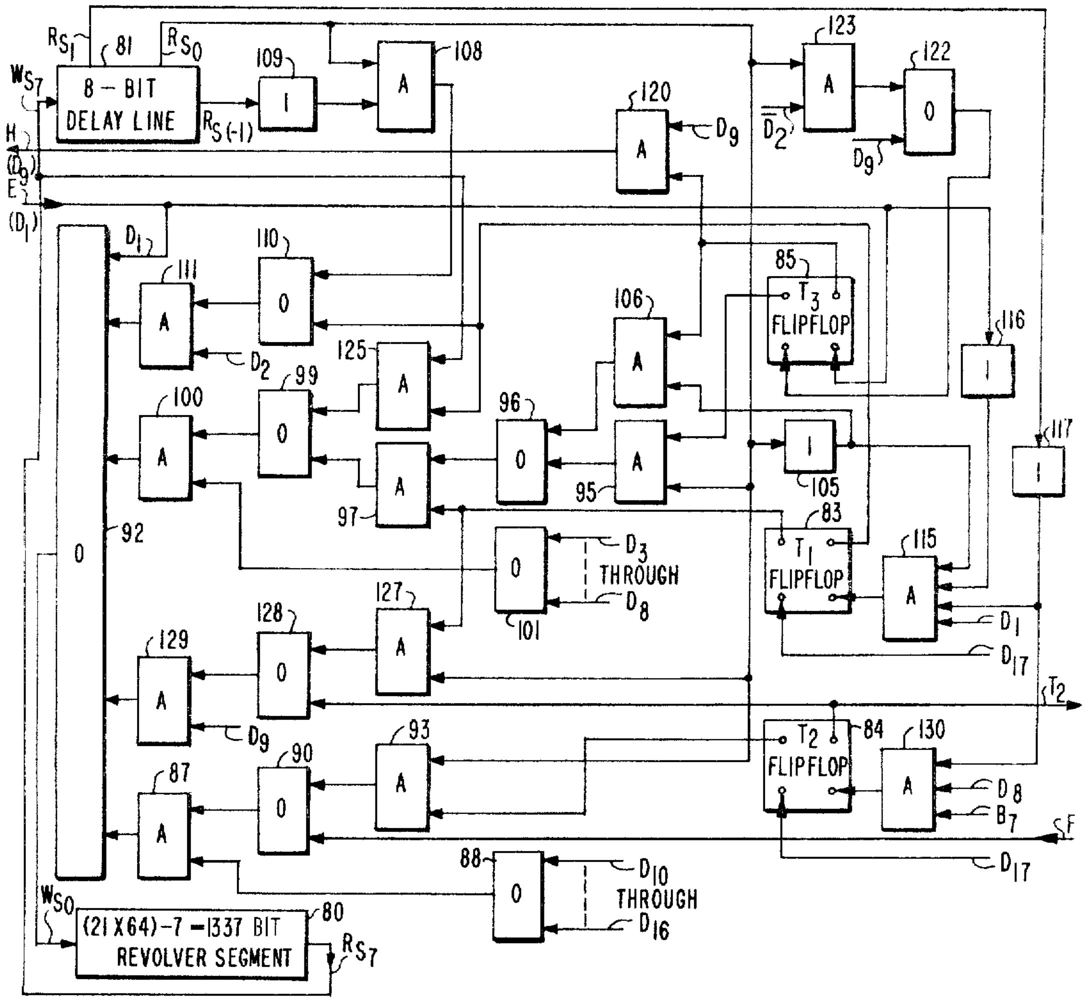
FIG. 4 is a block diagram of a synchronizing revolver which may be used in the system of FIG. 1.

The system of FIG. 4, the synchronizing revolver, uses a recirculating loop to receive character instructions for each of the rotating output printers, and to generate signals for timed actuation of each of the print wheels. This is done principally by a system which is arranged to receive the characters, which then effectively counts character positions in synchronism with the rotation of the print wheels, and which provides the control signal for a given print wheel in such manner that it may be transferred through the terminal revolver to a specific output printer. The generation of a control signal and its transfer to actuate a print hammer takes place within one character position of the print wheel.

In this arrangement the characters are continually recirculated in the synchronizing revolver, which is arranged with the associated logic so as to modify the count in a binary fashion during recirculation. The full recirculating data loop includes 1344 data bits, stored between a normal, write entry point $W_{S0}$ and a normal read output point $R_{S0}$. The loop capacity is subdivided into twenty-one bit positions for each character segment, there being sixty-four character segments for the sixty-four output devices. The revolver is actually separated into two different parts, one of which has 1337 bits, or seven bits less than the normal full loop. These seven bits are advantageously used in shifting data within the data recirculation loop. The remainder of the recirculating loop consists of an eight bit delay line 81 coupled in series with the revolver segment 80, but having taps at an $R_{S1}$ and an $R_{S(-1)}$ position as well as the normal $RS_0$ position. With a cycling rate of 350 revolutions per second, this loop also operates at the data transfer rate of 470,400 bits per second of the system.

Input data for the system is entered in the form of characters (F), each having seven bits and each provided from the data revolver on demand by the synchronizing revolver (in the form of the $T_2$ character request signal). Because there are seventy revolutions of the synchronizing revolver for each revolution of an individual output print wheel, there is slightly more than one revolution of the synchronizing revolver for each individual shift in character position of an output print wheel. These character positions may be referred to as the incremental parts of the cycles of the output devices. The successive "character arrival" or "character position" signals (E) derived at $D_1$ times from the terminal revolver in synchronism with the operation of the scanner and distributor under control of the timing signals, are returned through the terminal revolver for entry into the scanner and distributor system so as to control the action of the print hammer for an individual print wheel.

The sixty-four character segments are disposed serially (but not necessarily in a numerical progression) along the synchronizing revolver, the twenty-one bits for each character segment corresponding to the twenty-one D timing pulses derived from the timing control circuits. Certain of the B pulses which are used in conjunction with the data revolver are also employed in the synchronizing revolver. The $D_3$ through $D_8$ bits of each character segment are used to store the active character representing the number of positions by which the character to be printed is spaced away from the "home" position on the print wheel. The next character to be printed by that print wheel is stored in a reverse position (bits $D_{10}$ through $D_{16}$) and held ready for entry into the earlier positions at the appropriate time, with the remaining bit positions within the character segment being used for proper timing relationships. The characters stored in the selected parts of each character segment are continually replenished by transfer of the reserve character to the active position and new reserve characters are constantly supplied, on demand, from the data revolver.

The operation of the synchronizing revolver is continuous and highly integrated, and different modes of operation are not utilized except at different parts of the system as related to the different parts of the character segments. Various functions may be defined, however, these being established principally by three different flip-flops designated the $T_1$, $T_2$ and $T_3$ flip-flops 83, 84 and 85 respectively, which are used in conjunction with associated gating elements having conventional AND, OR and Inverter (I) designations.

*Data entry.*—A data character (F) in the form of a seven bit sequence is provided from the data revolver in response to a character request ($T_2$) signal, and entered in the $D_{10}$ through $D_{16}$ bit times. An AND gate 87 is successively conditioned by $D_{10}$–$D_{16}$ signals passed through an OR circuit 88 so that when the data is present it is transferred through another OR circuit 90, the AND gate 87 and a subsequent five input OR circuit 92 to the normal write input point of the revolver segment 80. The data revolver therefore enters the reserve characters as they are needed for each particular character segment upon the $T_2$ demand.

*Recirculation.*—The five input OR circuit 92 coupled to the normal input $WS_0$ of the revolver segment 80 is used for recirculation of the data derived from the normal $R_{S0}$ output of the eight bit delay line 81. Following the $D_{10}$ through $D_{16}$ interval the $T_2$ flip-flop 84 is reset in each instance by the $D_{17}$ timing pulse. The reset output signal from the $T_2$ flip-flop 84 conditions an AND gate 93 which is also coupled to the normal write input of the revolver segment 80 through the OR circuit 90, the AND gate 87 and the five input OR circuit 92. Thus characters contained in the $D_{10}$ through $D_{16}$ positions of the recirculating loop positions are thereafter recirculated without change until, as shown below, they are shifted into the active character position.

Data derived during the $D_3$ through $D_8$ bit times from the normal read output of the eight bit delay line 81 is also recirculated without modification if both the $T_1$ flip-flop 83 and the $T_3$ flip-flop 85 are in the reset condition. Except at the "home" position of the print wheel, however, this event does not occur more than once without interruption by a count modification sequence. Data is recirculated at these times by being passed through an AND gate 95 which is conditioned by the $T_3$ flip-flop 85, an OR circuit 96, and a serially coupled AND gate 97 which is conditioned by the $T_1$ flip-flop 83. Thereafter the data pulses are passed through an OR circuit 99 and an AND gate 100 which is conditioned by the $D_3$ through $D_8$ pulses provided through an OR circuit 101. Output signals from the AND gate 100 are applied as one input to the five input OR circuit 92.

*Count modification and generation of H signal.*—The change in the count of the active character in a given character segment is effected solely within the recirculation loop, without the use of addressing counter, subtracting circuits or separate read-write circuits. The character is initially in the form of a seven digit binary number, whereas there are 64 character positions on each print wheel, the last of which is blank, so that a "no print" instruction constitutes a full sequence of binary "1's." The count is modified during circulation by using inversion of the data and selective gating controlled by the $T_1$–$T_3$ flip-flops 83–85. The binary count contained in the active position is successively reduced by one for each E input signal. The E signal occurs at $D_1$ time to set the $T_3$ flip-flop 85; this conditions an AND gate 106 which receives inverted data from an inverter circuit 105 coupled to the normal $R_{S0}$ output of the eight bit delay line 81. The AND gate 106 passes "1" value signals for each binary "0" in succession starting with the lowest order bit, and inverts the first (but only the first) binary "1" thereafter to a binary "0." These signals thereafter pass through the successive circuits 96, 97 and 99, to be gated into the revolver segment 80 at $D_3$ through $D_8$ bit times at an AND gate 100 coupled to the five input OR circuit 92. The $T_3$ flip-flop 85, it is to be noted, is set by each character arrival (E) pulse. Approximately one E pulse is provided for each full cycle of the synchronizing revolver, so that the count stored in the $D_3$ through $D_8$ positions will typically use this inversion of the start of each character for each recirculation.

The first binary "1" of a sequence is passed into the recirculation loop in inverted form but also concurrently resets the $T_3$ flip-flop 85 through an OR circuit 122 coupled to an AND gate 123 which is conditioned except at $D_2$ bit time. Successive reversal of the lowest order binary counts in this manner will be seen to provide a binary reduction in the count. Consider that if there is only one character position to be passed, the count in the $D_3$ through $D_8$ positions will be 100000. Thus on the first recycling the $T_3$ flip-flop 85 is reset at $D_3$ time, but the count becomes 000000 and the count has reached all zeros so that the H signal may be generated.

A fuller sequence, but limited to three binary digits for simplicity, might be illustrated as follows:

TABLE B

| E pulses: | Binary count |
|---|---|
| | 111 |
| 1 | 011 |
| 2 | 101 |
| 3 | 001 |
| 4 | 110 |
| 5 | 010 |
| 6 | 100 |
| 7 | 000 |
| 8 | 000 |

The H pulse is generated whenever the all "0's" state is reached. Under these circumstances, the $T_3$ flip-flop 85 remains set until $D_9$ time, conditioning an AND gate 120 which receives the $D_9$ pulse. The gated $D_9$ pulse constitutes the H signal; the $T_3$ flip-flop is concurrently reset by the $D_9$ pulse applied through the OR circuit 122.

*Character shift.*—The reserve character is shifted into the active position at the "home" position of the associated print wheel, as indicated by two successive cycles of data within the loop without an E pulse. Whenever an E pulse is returned at $D_1$ time to indicate the passage of another printing position on the print wheel for the given character segment, the E pulse is entered as a $D_1$ bit through the five input OR circuit 92. If there is no E pulse during a given cycle, the $D_1$ bit value remains a zero. On the next cycle, if there is no E pulse, an AND gate 115 is fully activated at $D_1$ time. This AND gate receives signals through separate inverters 105, 116 and 117 representing the $R_{S0}$, E and $R_{S1}$ signals respectively, as well as the $D_1$ pulse. The output pulse from the AND gate 115 sets the $T_1$ flip-flop 83 conditioning an AND gate 125 which is coupled in a by-pass part of the loop. Data in the by-pass loop is shifted in the time domain so as to re-enter the circulating loop in the $D_3$ through $D_8$ positions, seven bit times earlier than previously circulated. By this means the next character for activation of the print mechanism is shifted from the reserve position into the active position.

The $D_2$ bit value for a given character segment is usually recirculated as a "0" because an E pulse is normally returned within a cycle. The $D_2$ bit value is entered whenever the $T_1$ flip-flop 83 is set, because the AND gate 111 is then conditioned by the signal from the $T_1$ flip-flop 83 through the OR circuit 110. As long as an E pulse is not provided, the $D_2$ signal remains in the loop through activation of an AND gate 108 which receives the normal $R_{S0}$ output and an output from the $R_{S(-1)}$ terminal of the eight bit delay line 81 taken through an inverter 109. If, therefore, no E pulse had arrived during the previous cycle, so that $D_1$ was at a "0" value, the $D_2$ bit would remain unchanged, by application of the output of the AND gate 108 through an OR circuit 110 and an AND gate 111 which is conditioned by the $D_2$ timing pulses.

*Reception of new data character.*—Because the $T_1$ flip-flop 83 is normally in a reset condition, during the principal part of a count modification sequence, and AND gate 127 is normally conditioned to pass pulses at $D_9$ time through an OR circuit 128 and an AND gate 129 to the five input OR circuit 92.

This recirculating pulse was entered originally when the $T_2$ flip-flop 84 was set as described below, and a data character was entered in bit positions $D_{10}$ through $D_{16}$. The recirculating pulse at $D_9$ time prevents connection of the synchronizing revolver to the data line F and entry of a new character into the "ready" spaces $D_{10}$ through $D_{16}$ until the character previously occupying these spaces is emptied into the "count-down" positions $D_3$ through $D_8$.

When the $T_1$ flip-flop 83 is set as indicated previously for character shift the $D_9$ pulse is not recirculated through AND gate 127. During any cycle thereafter and, in particular, when the data revolver cycle time $B_7$ coincides with synchronizing revolver time $D_8$ (which occurs every 35 cycles of the synchronizing revolver) the $D_9$ space is interrogated through the $R_{S1}$ line from the eight bit delay line 81. If there is no bit in the $D_9$ space, AND gate 130 is activated at $D_8$ time to set the character entry or $T_2$ flip-flop 84. This $T_2$ signal to the data revolver triggers release of a new character from the F line during times $D_{10}$ through $D_{16}$. The character enters the synchronizing revolver through OR gate 90, and gate 87 and the five input OR gate 92. The character recirculates thereafter through AND gate 93, OR gate 90, AND gate 87, the five element OR gate 92, and back into the revolver and delay line segment. During the same cycle when the $T_2$ flip-flop 84 was set for character entry, a $T_2$ signal was used to write a new bit at $D_9$ time through OR gate 128, AND gate 129 and OR gate 92. This again bars entry of a new character into space $D_{10}$ through $D_{16}$ until another character shift takes place.

*Summary of operation.*—Once a character is entered in the $D_{10}$ through $D_{16}$ positions of a given character segment, it constantly recirculates in this reserve position until the active character then contained in the $D_3$ through $D_8$ positions is decreased in steps of one to the zero value and the H signal is provided. Then the reserve character is shifted into the active position, the six bits $D_3$ through $D_8$ being used for the count. The count modification is actually controlled by the $T_3$ flip-flop 85, which is set at each $D_1$ time and reset, following $D_2$ time, by the first data bit which has a "1" value. For as long as the $T_3$ flip-flop 85 is set, the recirculated data is inverted by the circuit 105, and passed through the AND gate 106 and associated gates into the revolver segment 80. This inversion of selected parts of the $D_3$ through $D_8$ bit values, starting in each instance with the lowest order value, is the equivalent of binary subtraction, and ultimately results in reaching all "0's." If the character is entirely "1's," this signifies a "no print" command for that revolution of the print wheel, and the hammer is activated when a blank is presented on the wheel. When the all "0's" condition is present, the $T_3$ flip-flop 85 is not reset until after the "print at next character" (H) signal has been generated at $D_9$ time.

Concurrently the $D_1$ and $D_2$ values are used in conjunction with the E signal to identify the "home" position of the print wheel, and to control the character shift from the reserve to the active positions. At the "home" position, the character shift takes place simply by bypassing a part of the synchronizing revolver so as to shift the data bits into proper time relationship for the active position. New characters are entered after the previously entered characters are shifted down.

*Data revolver*

Figure 5:
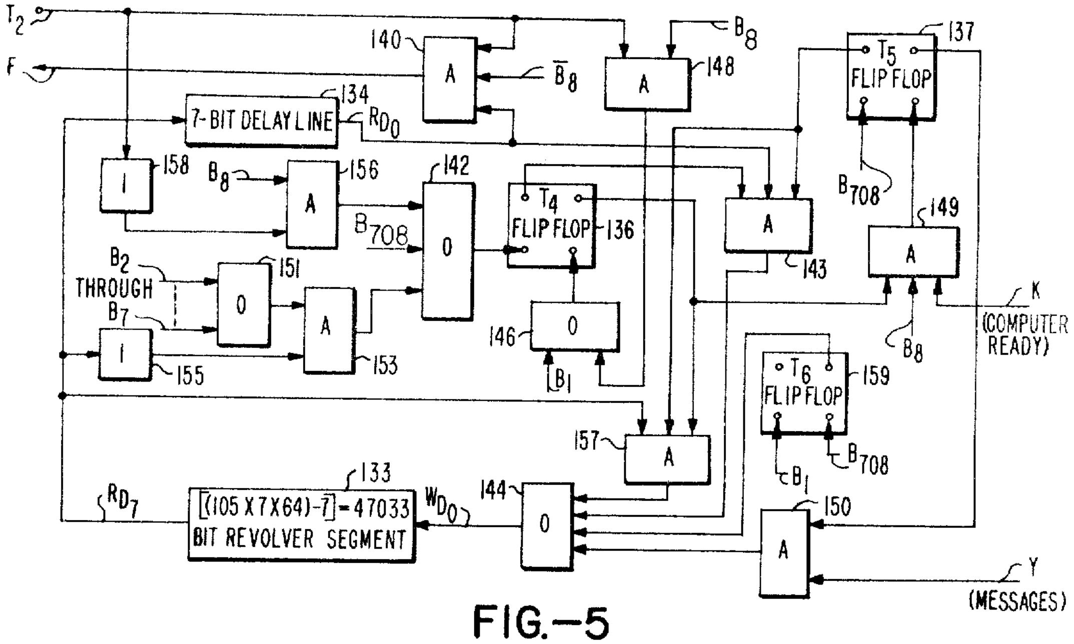
FIG. 5 is a block diagram of a data revolver which may be used in the system of FIG. 1.

The data revolver, shown in FIG. 5, utilizes a revolver segment 133 having 47,033 bits, and rotates at ten cycles per second. The total data revolver capacity is determined by provision for 105 characters per message segment, each character space being seven bits long, there being sixty-four message segments. This gives a total of 47,040 bits, but seven fewer bits are used in the revolver segment 133, these seven additional delay increments being supplied by a seven bit delay line 134, to permit shifting of characters in time within a message segment by utilizing a by-pass around the seven bit delay line 134.

For convenience, in order to provide the needed storage capacity with workable bit densities for the selected cycling time, two or more tracks on the same drum or disc may be used with the reproducing head of one track being coupled to the recording head of the next track, until the desired total delay is achieved. This expedient will be understood to be useful by those skilled in the art and has accordingly not been shown. The principal control functions of this system are effected by gating elements controlled by a $T_4$ flip-flop 136 and a $T_5$ flip-flop 137. The timing signals which are used in this arrangement are the eight bit series from $B_1$ to $B_8$, occurring at the start of each message segment, and a later timing pulse $B_{708}$, occurring after the 100 characters of the full message but before the end of the 735 bit message segment.

The input signals provided to the data revolver are the data itself (Y) and "computer ready" (K) signals, both from the central data processing system, and the character request signal ($T_2$) from the synchronizing revolver. At the appropriate times, individual characters are transferred from the normal output $R_{D0}$ of the seven bit delay line 134 into the synchronizing revolver.

The data bits corresponding to the $B_9$ to $B_{15}$ positions, and which therefore occur at the $D_{10}$ to the $D_{16}$ times of the synchronizing revolver, are those which are transferred from the normal output of the seven bit delay line 134 through an AND gate 140 to the synchronizing revolver. This AND gate 140 is activated by the $T_2$ signal from the synchronizing revolver during these bit times and is fully activated by the $\bar{B}_8$ signal, representing times other than the $B_8$ bit time. Thereafter the $T_2$ signal terminates on reset of the $T_2$ flip-flop 84 at $D_{17}$ time, and the data is recirculated in accordance with the considerations set out below until a new character is needed.

*Normal recirculation function.*—Both the $T_4$ flip-flop 136 and the $T_5$ flip-flop 137 are reset at the $B_{708}$ bit time, the $T_4$ reset signal being derived through an OR circuit 142. The reset output signals from both these flip-flops 136, 137 fully activate an AND gate 143 which is coupled to the output of the seven bit delay line 134. The data bits are recirculated between the normal write input and read output until either the $T_4$ flip-flop or the $T_5$ flip-flop 137 is again set. Normal inputs to the revolver segment 133 are entered through an OR circuit 144.

Recirculation continues in this manner for a given message segment until either the $T_2$ signal is provided to set the $T_4$ flip-flop 136 through an AND gate 148 conditioned at $B_8$ time or the K signal is thereafter provided to set the $T_5$ flip-flop 137 through an AND gate 149 conditioned by the set output of the $T_4$ flip-flop 136 at $B_8$ time.

*Entry of new data.*—The $T_4$ flip-flop 136 is set by a $B_1$ pulse through the OR circuit 146 to the set input. Between time $B_2$ and $B_7$ the $T_4$ flip-flop 136 is reset through AND gate 153 and OR gate 142 if any of the bit pulses appearing at the output $R_{D7}$ of revolver segment 133 are "zeroes" as indicated by output from inverter 155. If the $T_4$ flip-flop 136 is still on at $B_8$ time this indicates all the bit positions were "ones" in the message character positions. An "all one" configuration is the bit pattern generated by the $T_6$ flip-flop 159 at the end of a normal 100 character message space. The presence of all ones in the second character space being interrogated during $B_2$ through $B_7$ times indicates that the present 100 character store has been transferred as described in the section below on shifting of data. The set position of the $T_4$ flip-flop 136 at $B_8$ time now sets the $T_5$ flip-flop 137 through AND gate 149 if the computer is ready to send another 100 character message block as indicated by a K signal. (If the K signal does not appear the condition is preserved to succeeding cycles when the K signal does appear.) When the $T_5$ flip-flop 137 is set, AND gate 150 is activated to pass the computer data through to OR gate 144 and thence into the revolver segment 133. This data entry stops at $B_{708}$ when the $T_5$ flip-flop 137 is reset.

*Shifting of data.*—When the synchronizing revolver is ready to receive a new character the line $T_2$ will be active from $B_8$ through $B_{16}$ times. From $B_9$ time through $B_{16}$ time, AND gate 140 will be conditioned to pass the output of the seven bit delay line 134 into line F and thence to the synchronizing revolver. With normal recirculation conditions the output of the seven bit delay line contains the character to be transferred at $B_9$ through $B_{16}$ times because this character occupies the second character space in the 105 character revolver segment. When a character is transferred out of the data revolver all the following characters must be advanced or "shifted down" by one character in order for a fresh character to be positioned properly for the next transfer. This is accomplished by having the character request signal $T_2$ activate AND gate 148 at $B_8$ time to set $T_4$ flip-flop 136. When $T_4$ is set and new data is not entering the revolver as indicated by the $T_5$ flip-flop 137 being in a reset mode, AND gate 157 will be activated to pass the output of the main revolver segment 133 around to the input side of the revover through OR gate 144 and by-passing the normal circulation path through the seven bit delay line 134 and the circulation AND gate 143. Thus all the remaining characters are advanced in the revolver by one character position. At the end of the message character segment are the "all ones"–"no print" characters generated by the $T_6$ flip-flop 159. These characters are also shifted down and when they appear in the second character space they indicate that the message segment has been transferred and a new 100 character message can be received from the computer. If the character request ($T_2$) signal is not present at $B_8$ time, and AND gate 156 is conditioned by the signal from an inverter circuit 158, so as to pass the $B_8$ bit time signal through the OR circuit 142 to reset the $T_4$ flip-flop 136. This merely resets the system under the next $T_2$ signal is applied. The $T_4$ flip-flop 136 is also reset by the $B_{708}$ signal applied through the OR circuit 142.

*Data revolver summary.*—When a complete data message is available, as indicated by the K signal, and the $T_4$ flip-flop 136 has remained set following the $B_8$ bit time, the revolver segment 133 has been substantially cleared of data and input signals are applied through the AND gate 150 and the OR circuit 144 to the revolver segment 133. These signals are recirculated within the main recirculating loop until a character request signal is provided at which time one character is read out through the AND gate 140 while the remaining characters are shifted up one character position within the message segment through the by-pass AND gate 157.

*Timing circuits*

Figure 6:
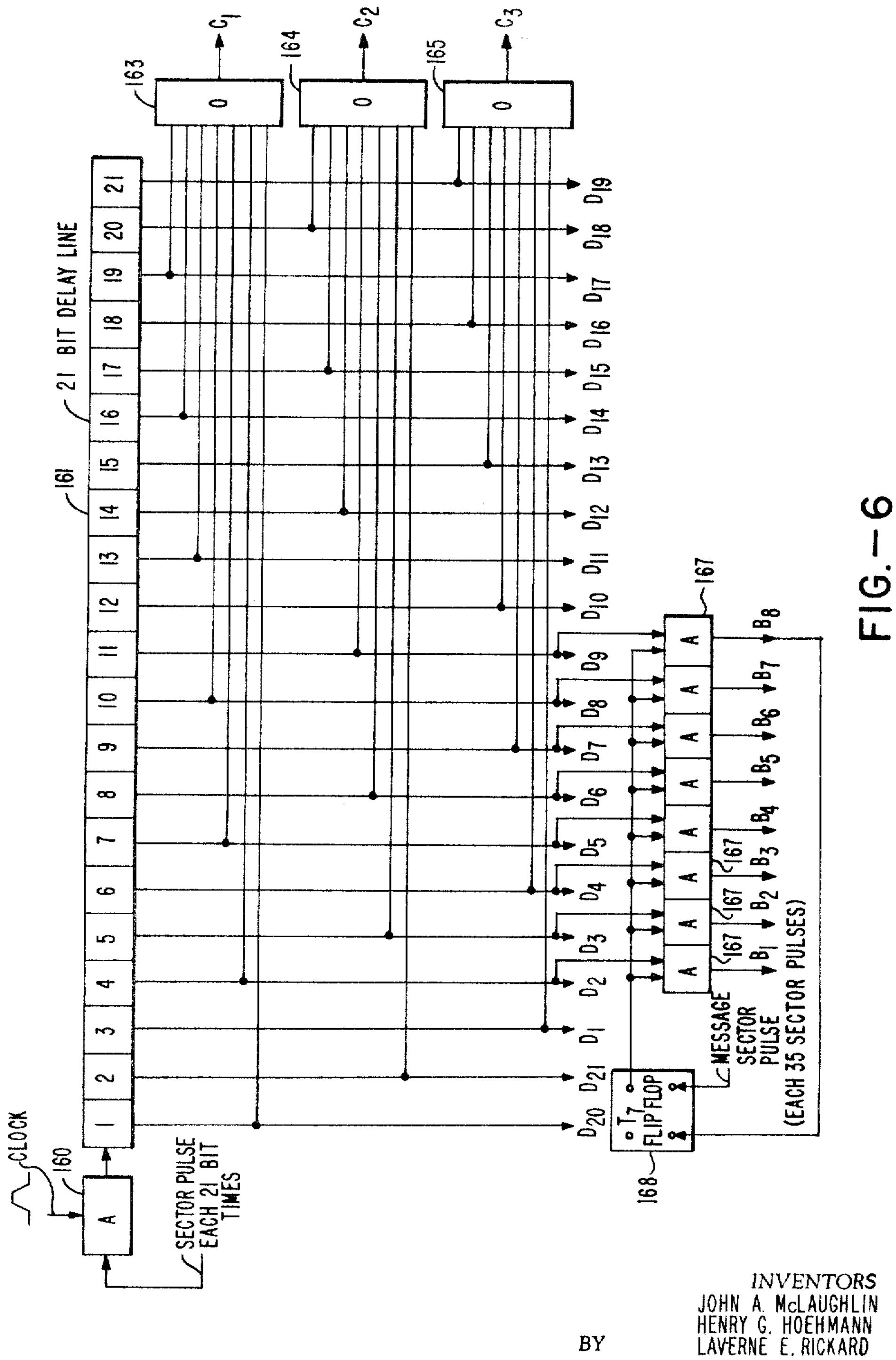
FIG. 6 is a block diagram of timing control circuits which may be employed in conjunction with the system of FIG. 1.

The various revolvers may be synchronized and the different C, D and B timing pulses generated in the proper relationship by the preferred timing signal generator shown in FIG. 6. The input signals for this system are a sector pulse provided from the timing track of the central data processing system every 21 bit times and a master clock occurring at the basic data transfer rate of 470,400 bits per second. Both pulses are applied to an AND gate 160 which is coupled to provide input signals to a 21 bit multi-tapped delay line 161, the individual elements of which are selected to provide the established delay intervals for the selected bit rate. Thus output signals taken from the different taps of the delay line 161 constitute the $D_1$ through $D_{21}$ timing pulses. The pulse sequences are arranged to start three bit times after the sector pulse simply by using the third tap as the $D_1$ bit time pulse.

The $C_1$, $C_2$ and $C_3$ bit time pulses may then be generated by selective couplings of OR circuits 163, 164, 165 to the appropriate output taps of the 21 bit delay line. The $C_1$ pulses, which coincide with $D_2$, $D_5$, $D_8$, etc. pulses are thus provided directly by connecting the corresponding output taps through the OR circuit 163.

The $B_1$ through $B_8$ pulses are generated at $D_2$ through $D_9$ times only at the start of each message segment. In order to terminate the B pulse series until the $B_{708}$ bit time, the $D_2$ through $D_9$ pulses are applied individually to different ones of a group of AND gates 167 which are individually conditioned by set output pulses from a $T_7$ flip-flop 168. The $T_7$ flip-flop 168 is set each 35 sector pulses by a message sector pulse and reset by each $B_8$ pulse, so that the B series is not used (except for $B_{708}$) after $B_8$ until the 735 bits of a message have passed and the next message segment is reached.

While terminal numbering is arbitrary, if the terminal wires were to be connected in line and numbered consecutively, the scanner logic would be set to connect to each one of these lines in succession for the assigned three bit times. Because the terminal revolver logic is set to produce the print hammer signal at $C_4$ time relative to the scanned line (or $C_1$ time of the next line segment using the repetitive three bit terminal revolver time nomenclature), the distributor connection to the terminals must lag the scanner by one line. Thus, while the scanner is connected to line 6, for example, the distributor is connected to line 5.

If a consecutive sequence is used at the scanner distributor and terminal revolver arrangement, the synchronizing revolver, being seven times as long as the terminal revolver, will be connected to every seventh terminal in the terminal revolver sequence. If the two revolvers start operating together on line 1 the synchronizing revolver will next connect to line 8 then to 15, 22, 29, 31, 43, 50, 57, 64, 7, 14, and so on. The line number corresponding to the $n^{th}$ synchronizing revolver cycle is given by the expression:

$L_n=[(n-1)R+1$ minus the nearest lower multiple of 64 less than the quantity $(n-1)R+1]$ where R is the ratio of adjacent revolver lengths—in this case 21/3 or 7.

Thus the twelfth synchronizing revolver connection is to $L_n=[(12-1)7+1-64]=14$.

The data revolver has a speed 1/35 that of the synchronizing revolver, so if it, too, starts with line 1 the next line it connects to is line 54, then in sequence lines 43, 32, 31, 10, 63, 52, 41, 30, 19, 8, 61, 50, etc. and a general expression for the $n^{th}$ line connection at the data revolver is:

$L_n=[(n-1)R_1R_2+1$ minus the nearest lower multiple of 64 less than quantity $(n-1)R_1R_2+1]$ where $R_1$ is the terminal-to-synchronizing revolver ratio, $R_2$ is the synchronizing-to-data revolver ratio of $R_1R_2$ is the terminal-to-data revolver ratio.

Thus the 14th connection at the data revolver is to:

$$L_{14}=[(14-1)(7\times35)+1-49\times64]=3185+1-3136\ L_{14}=\text{Line }50.$$

Line numbering can be arbitrary, so the computer informtaion can be stacked into the data revolver in line number sequence and this data will appear at positions on the terminal board which can be calculated by a reverse of the process just described. One could, of course, send the data from the computer into the data revolver in sequential terminal order, observe the terminal posts through which each block of data appears, and number the terminals accordingly.

*Output terminal equipment*

Figure 7:
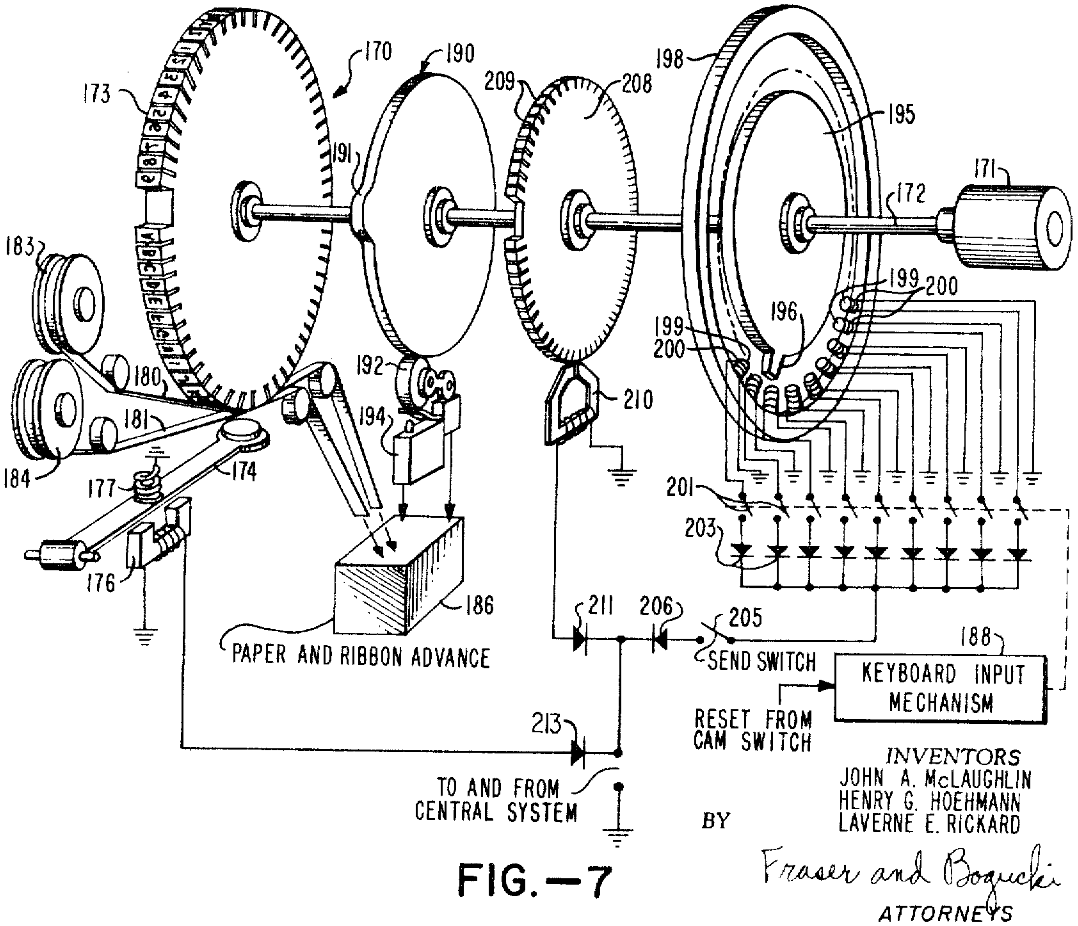
FIG. 7 is a combined perspective and block diagram representation of the principal elements of a terminal data set which may be used in the system of FIG. 1.

The mechanisms disposed at each output terminal are arranged to cooperate with the central data processing system, including the various revolvers and the scanner and distributor, so that only a minimum of equipment need be installed at each separate output terminal. As shown in FIG. 7, each output terminal includes a rotating print wheel 170 driven at the desired rate by a motor 171 mounted on a common shaft 172. Peripheral characters 173 on the print wheel 170 are engaged by an associated print hammer 174 which is held in the non-printing position by an electromagnet 176 and which is driven when released against the print wheel 170 by a spring 177. The hammer 174 is actuated by the printing pulses generated within the revolver system and distributed to the output terminal when the proper character is under the printing position. Carbon ribbon 180 and paper strips 181 are fed past the printing position from supply reels 183, 184, to a paper and ribbon advance mechanism which is actuated by individual energizing pulses to provide single step advances.

After the printing of each character, the hammer 174 may be reset and the paper and ribbon must be advanced, and the "home" position must be identified for the revolver system. Additionally, each successive character position is identified by a character signal which is returned to the revolver system. These functions are provided by a group of separate mechanisms mounted on the common shaft 172 and positioned to cooperate so as to supply these various functions in a simple manner. Additionally, this combination includes means cooperating with a keyboard input mechanism 188 to return character data to the central system.

Three separate members are mounted on the common shaft 172 which couples the print wheel 170 and the driving motor 171. A first of these members is a rotatable reset cam 190 having an external cam lob 191 which is positioned in parallelism with the "home" position of the print wheel 170. A rotary cam follower 192 in engagement with the cam contour surface is therefore raised as the print wheel 170 reaches the "home" positon, to close a switch 194 which provides an energizing pulse to the ribbon and paper advance mechanism 186. The hammer 174 may be reset mechanically or electrically by conventional means (not shown) operating from the reset cam 190.

A second member mounted on the shaft 172 is an encode wheel 195 having an external pole tip 196 which passes within an external annulus 198 having inwardly directed pole tips 199, each of which includes an integral pickup coil 200. Each of the coils 200 is coupled through a separate switch 201 and an isolating diode 203 to a common send switch 205. The separate switches 201 are selectively closed in different patterns by actuation of the individual keys of the keyboard mechanism 188 while the terminal set is in the send mode.

The common send switch 205 is coupled, through an isolating diode 206, to a circuit junction formed with connections from a third member, the clock wheel 208, mounted on the common shaft 172. The clock wheel 208 is a magnetic member having an external lobe 209 corresponding to each character position, and lacking two lobes at the "home" position. Thus the "home" positon may be identified at the synchronizing revolver by the absence of two successive character pulses. A magnetic head 210 disposed adjacent to the periphery of the clock wheel provides signals through an isolating diode 211 to the circuit junction formed with the connection from the encode wheel 195. This circuit junction is connected directly to the terminal coupled to the scanner and distributor at the central data processing system. By the use of an isolating diode 213 in circuit with the energizing electromagnet 176 at the print hammer 174, print pulses may be returned on the same conductors to control printing.

This arrangement permits cooperation between a number of terminal sets and the central system, even though each terminal set performs multiple functions and the great majority of the circuitry is located at the central system. When the arrangement is printing data supplied from the central system, the "home" position is properly identified, the hammer 174 is reset, and the paper 181 and ribbon 180 are advanced. Then the character pulses are returned from the clock wheel 208 until the proper position is reached and the electromagnet 176 is energized to fire the print hammer 174. At the next "home" position the operation is again repeated.

The arrangement further permits characters to be returned to the central system, by signal patterns applied to the encode wheel 195 mechanism from the switches 201 controlled by the keyboard mechanism 188. These character patterns are identified from the normal character pulses by using an overlapping time relationship between pulses generated at the two mechanisms. Note that the two pulse series are combined at the common circuit junction. The pulses generated by the clock wheel 208 mechanism each have a selected duration, and occur in periodic fashion except at the "home" position. The pulses generated by the encode wheel 195 mechanism overlap these individual pulses slightly, but are of the same duration. When combined, therefore, the character is approximately twice the duration of the character pulse, and may readily be identified.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A system for deriving time domain command information for each of a number of output devices in response to separate characters of a plurality of multi-character messages, including the combination of first revolver means operating at a selected data transfer rate and a selected cycling rate for receiving the messages in succession, second revolver means coupled to the first revolver means to receive individual characters from each of the messages, the second revolver means operating at the selected data transfer rate and a cycling rate higher than the selected cycling rate and including means for converting each character to an impulse in the time domain, third revolver means coupled to receive the time domain impulses from the second revolver means and operating at the selected data transfer rate and a higher cycling rate than the selected cycling rate, such that the impulses from the second revolver means are provided as command pulses at various times in a timed controlled cycle, the times being determined by the characters of the messages.

2. A system for converting characters from a plurality of individual messages into control impulses in the time domain, the control impulses being provided in selected positions relative to established cycles, the system including the combination of three serially coupled revolver means, each having the same data transfer rate, but successively smaller capacities and higher cycling speeds, a first of the revolver means storing multi-character message sequences at a first cycling rate, higher than the cycling rate of the fixed cycles in which the pulses are to be generated, a second revolver means being coupled to store character sequences, at least one character from each of the successive message sequences being disposed thereon in interleaved fashion, the ratio of the cycling rate of the second revolver means relative to the cycling rate of the first revolver means being the same as the ratio of the number of character positions on the first revolver means related to the number of character positions on the second revolver means, such that a succession of character positions may be recorded thereon in interleaved fashion without unused storage space on the second revolver means, the second revolver means including means for converting the characters into time domain representations, and the third revolver means having a sequence of multi-bit positions, the number of bits on the third revolver means having the same ratio to the number of bits on the second revolver means as the cycling rate of the second revolver means has to the cycling rate of the third revolver means, the bits for a given message being interleaved on the third revolver means relative to the second revolver means such that the data on the third revolver means is presented at times corresponding to the times of presentation of like data at the second revolver means.

3. A system for actuating each of a plurality of cyclic output devices from a common central data source providing multi-character messages to be printed by the various cyclic output devices, comprising message revolver means operating at a cycling rate in excess of that of the cyclic output devices, so that at least one character is provided for each cyclic output device per revolution of each cyclic output device, character revolver means coupled to receive characters for the separate cyclic output devices from the message revolver, the character revolver means including means for initiating actuation of an individual cyclic output device, and operating at a cycling rate sufficiently high that each change of a character position of a cyclic output device involves more than a cycle of revolution of the character revolver, and terminal revolver means including scanner and distributor means coupling the individual cyclic output devices to the character revolver means, the terminal revolver means operating at a cycling rate such that each character position of each cyclic output device is scanned a number of times, whereby character position pulses from the output devices may be returned to the character revolver and printing actuating pulses may be transferred from the character revolver through the terminal revolver to the individual cyclic output devices.

4. A digital communication system for operating each of a number of terminal data sets under control of a central data processing system, the terminal data sets each including a rotating output device having a plurality of characters thereon and providing character position pulses, including first revolver means having a plurality of message segments thereon and coupled to store different multi-character messages for each of the terminal data sets, the first revolver means operating at a first cycling rate, second revolver means having a plurality of character segments thereon, each corresponding to a different terminal data set, the second revolver means operating at a second cycling rate substantially higher than the first cycling rate and storing successive character pairs from the different messages in the form of coded numerical values, the second revolver means also including means for successively reducing the numerical value of a first one of the characters in each character segment in response to character position pulses, and for providing output control pulses in response to a zero indication at a selected character, third revolver means having a plurality of bit segments and operating at a third cycling rate susbtantially higher than the second cycling rate, the third revolver means including means for transferring output control pulses from the second revolver means and character position pulses to the second revolver means, and scanner and distributor means coupling the third revolver means to the respective terminal data sets, the scanner and distributor means repetitively scanning each of the terminal data sets at a rate sufficiently high to couple each terminal data set to its associated third revolver means bit segment at least once per character position of each of the terminal data sets, such that character position pulses are provided through the third revolver means to the second revolver means and output control pulses are appropriately transferred to the terminal data sets through the third revolver means from the second revolver means.

5. A system for the transfer of data from a high speed device to control each of a number of low speed rotating output printer devices, each having a number of printing positions and each actuable at specific times within individual cycling intervals in accordance with the data, the system comprising first storage means responsive to the data from the high speed device for storing individual messages consisting of character sequences for the printer devices, second storage means coupled to the first storage means for storing successive characters from each of the individual messages, and including means for determining the time relation of each character to the individual cycling intervals of the associated printer devices, scanning and distributing means coupled to the printer devices and operating at a speed sufficiently high to scan each printing position of each printer device within each cyling interval, and third storage means coupling the second storage means to the scanner and distributor means for transferring control signals therebetween.

6. A system for data transfer and synchronization between a high speed central source and a lower speed cyclic output device which can record one character at a variable time per cycle comprising first cyclic means for storing multi-character messages, second cyclic means, operating at a substantially higher rate than the cyclic output device, and responsive to signals representative of character positions within the cycles of the output device, for converting an individual character to a time positioned output command in response to the character position of the cyclic output device, and third cyclic means responsive to the character position of the cyclic output device and coupling the second cyclic means to the output device, the third cyclic means operating at a substantially higher rate than the second cyclic means and coupling the output commands to the output device at times related to the cycling of the output device.

7. A system for controlling the times of actuation of cycling output devices in response to character messages provided from a source, including revolver means coupled to store the messages serially, the first revolver means recirculating the messages at a rate in excess of that of the output devices and including means for providing individual character information from each of the messages, second revolver means coupled to receive the character information in the form of a series of binary coded counts, the second revolver means storing the character information in series and including means for counting down each binary coded count in response to character arrival signals to provide printing control signals on reaching a zero count, the second revolver means recirculating characters at a rate in excess of the total of the rates of the output devices, and third revolver means coupled to transfer the printing control signals to the cycling output devices, the third revolver means including means responsive to the cycling of the output devices for returning character arrival signals to the second revolver means.

8. A system for controlling the times of actuation of cycling output devices in response to character messages provided from a source, including first revolver means coupled to store the messages serially, the first revolver means recirculating the messages at a rate in excess of that of the output devices, the first revolver means also including means for providing successive individual characters from each of the messages in response to character request signals, second revolver means coupled to receive the character information, the second revolver means recirculating characters at a cyling rate in excess of the accumulated cycling rates for the various output devices, the second revolver means also including means for comparing printing position signals from the output devices to the characters to determine the arrival of a printing position, and to provide printing control and character request signals, scanner and distributor means coupled to each of the output devices, the scanner and distributor means scanning each of the output devices at least once for each change of a character position of an output device, and third revolver means coupling the second revolver means to the scanner and distributor means, the third revolver means operating at a cycling rate synchronous with the scanner and distributor means.

9. A system for distributing message data from a data processing system to each of a number of cyclically operable output devices comprising first revolver means for separately storing sequences of characters representing the messages from the data processing means; second revolver means for separately storing successive characters from each of the messages, the second revolver means including means to determine the arrival of a selected character at a selected position of revolution at said second revolver means, third revolver means selectively responsive to the arrival of characters at selected cycling positions at said output devices for providing output control signals having controlled time relationships to the cycling of the output devices, and scanner and distributor means coupling the third revolver means to the output devices.

10. A system for transferring selectively appearing control pulses to each of a multiplicity of cycling output devices which are scanned in succession, to actuate the cyclic output devices in accordance with character instructions for each output device, the character instructions being in the form of numerical counts, the system comprising first revolver means operating at a cycling rate such that there is at least one cycle for each cyclic increment of an output device, the first revolver means being coupled to receive the character counts and to diminish the character counts in response to cycle increment signals, the first revolver means also including means to provide control pulses at selected times within the output device cycles as determined by the characters, second revolver means coupled to receive the control pulses from the first revolver means, and transferring received cycle increment signals to the first revolver means, the second revolver means operating at a cycle rate sufficiently in excess of that of the first revolver means to insure at least one data transfer for each character, and scanner and distributor means operating synchronously with the second revolver means for coupling the second revolver means to individual output devices in turn.

11. A cyclic storage system for selectively storing and counting down a binary coded character in response to successive input signals comprising a cyclic storage device, means for serially recording the bits of the character, lowest order bit first, on the cyclic storage device, means coupled to the cyclic storage device providing a data recirculation loop, and means responsive to the input signals and coupled in the recirculation loop for selectively inverting the bits of a character, lowest order bit first, in a succession up to and including the first binary one value encountered, during recirculation of the character.

12. A cyclic storage system for selectively storing and decreasing the count of a binary coded character in response to successive input signals comprising a cyclic storage device, means coupled to the cyclic storage device for providing a data recirculation loop, means coupled to receive a character to be stored for serially recording the bits of the character, lowest order bit first, on the cyclic storage device, an inverter circuit coupled to the data recirculation loop, gating means coupled to separately receive inverted and noninverted data bits in the recirculation loop, bistable means controlling the gating means in accordance with the state of the bistable means, means responsive to the value of the data bits for setting the bistable means to pass inverted data bits, and means responsive to a selected binary value of the data bits for resetting the bistable means to operate the gating means so as to thereafter pass noninverted data bits in the recirculation loop.

13. A system for separately transferring segments of different data sequences for different destinations comprising a revolver having a full data recirculation loop and a by-pass loop therein, and operating at a selected data transfer rate, means for entering data sequences in the revolver, timing signal generating means operating synchronously with the revolver for defining each data sequence by timing signals, means coupled to the recirculation loop and responsive to the timing of signals for transferring out a first segment of each data sequence, and means coupled to respond to the transfer of data and to the timing signals for controlling the by-pass loop, to shift segments of the data sequences subsequent to the first segment of the sequence.

14. A system for separately transferring individual characters, in timed relation, from each of a number of multi-character messages intended for different destinations, the system comprising a pair of revolvers, the first of the revolvers having a first cycling rate and a first data bit capacity to provide a selected data transfer rate, the second of the revolvers having a second cycling rate and a second data bit capacity, the ratio of the second cycling rate to the first cycling rate corresponding to the ratio of the first data bit capacity to the second data bit capacity, such that the data transfer rates are the same, the first revolver including a full data recirculation loop and a by-pass loop therein, the by-pass loop being one character time less than a full cycle, means for entering the multi-character messages in the first revolver, timing signal generator means coupled to the revolvers for defining each character with a sequence of timing pulses, means coupled to the recirculating loop of the first revolver for transferreing out the first character of each message to the second revolver, means coupled to respond to the transfer of data characters from the first revolver to the second revolver, and the timing signal generator and controlling the by-pass loop, for recirculating data bits in the by-pass loop for the remainder of a message after the first character, and means coupled to derive character information from the second revolver.

References Cited

UNITED STATES PATENTS

| | | | |
|---|---|---|---|
| 2,776,618 | 1/1957 | Hartley | 101—93 |
| 2,799,222 | 7/1957 | Goldberg et al. | 101—93 |
| 2,850,566 | 9/1958 | Nelson | 340—172.5 |
| 2,853,696 | 9/1958 | Mendelson | 340—172.5 |
| 2,866,177 | 12/1958 | Steele | 340—172.5 |
| 2,872,665 | 2/1959 | Townsend et al. | 340—172.5 |
| 3,013,254 | 12/1961 | Walker | 340—172.5 |
| 3,095,553 | 6/1963 | Hill et al. | 340—172.5 |
| 3,117,306 | 1/1964 | Reitfort | 340—172.5 |
| 3,133,268 | 5/1964 | Avakian et al. | 340—172.5 |
| 3,202,972 | 8/1965 | Stafford et al. | 340—172.5 |
| 3,209,332 | 9/1965 | Doersam | 340—172.5 |
| 3,229,259 | 1/1966 | Barker et al. | 340—172.5 |
| 3,241,125 | 3/1966 | Tomasulo et al. | 340—172.5 |

ROBERT C. BAILEY, *Primary Examiner.*

J. P. VANDENBURG, *Assistant Examiner.*